J. T. HAILE.
TRUSS.
APPLICATION FILED NOV. 25, 1911.
1,051,325.
Patented Jan. 21, 1913.
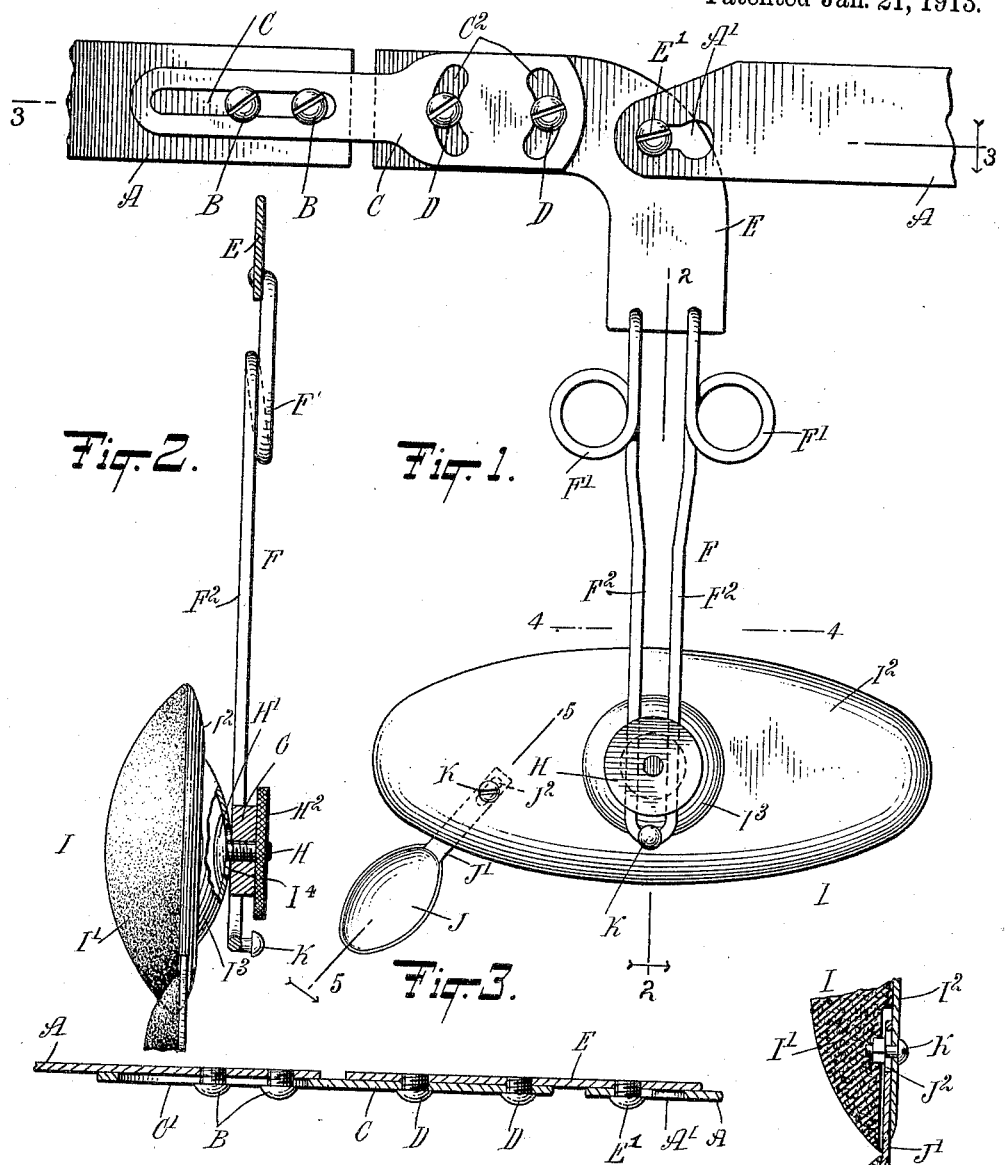
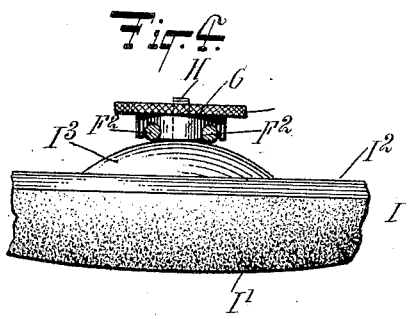
WITNESSES
George Bambay
[signature]
INVENTOR
James T. Haile
BY Munn & Co
ATTORNEYS

UNITED STATES PATENT OFFICE.

JAMES THOMAS HAILE, OF ALPINE, TEXAS.

TRUSS.

1,051,325.

Specification of Letters Patent.

Patented Jan. 21, 1913.

Application filed November 25, 1911. Serial No. 662,352.

*To all whom it may concern:*

Be it known that I, JAMES T. HAILE, a citizen of the United States, and a resident of Alpine, in the county of Brewster and State of Texas, have invented a new and Improved Truss, of which the following is a full, clear, and exact description.

The invention relates to surgery, and its object is to provide a new and improved truss, arranged to permit in placing the pad into any desired position, securely holding it therein to prevent irritation of the body, and to render the pad pliable and at the same time maintain a uniform pressure on the afflicted part.

For the purpose mentioned, use is made of a support and a pad connected with the said support in such a manner that the pad can be adjusted up or down or turned into a desired angular position so as to exert the desired pressure on the afflicted part.

A practical embodiment of the invention is represented in the accompanying drawings forming a part of this specification, in which similar characters of reference indicate corresponding parts in all the views.

Figure 1 is a front elevation of the truss; Fig. 2 is a transverse section of the same on the line 2—2 of Fig. 1; Fig. 3 is a sectional plan view of the same on the line 3—3 of Fig. 1; Fig. 4 is a sectional plan view of the same on the line 4—4 of Fig. 1; and Fig. 5 is an enlarged cross section of the pads on the line 5—5 of Fig. 1.

The belt A for supporting the truss on the body of a person is preferably in the form of a steel belt, and is provided at one end with clamping screws B engaging an elongated opening C' in a terminal plate C, to permit of lengthening or shortening the belt to suit the user. The plate C is provided with segmental slots $C^2$ engaged by clamping screws D screwing on a supporting plate E, of approximately L shape, and provided with a stud E' engaging an aperture A' in the free end of the belt A, so as to allow of opening or closing the belt. On loosening the screws D, the L-shaped supporting arm E may be turned to swing up or down, so as to move the downwardly-extending member of the said arm into a desired angular position relative to the vertical. On the lower end of the downwardly-extending member of the supporting arm E are secured the ends of a spring F formed with coils F' and parallel members $F^2$ between which fits a sliding block G engaged by a clamping bolt H carrying the pad I employed for engaging and pressing on the afflicted part. The pad I is preferably formed of a body I' made of sponge rubber and secured to a back $I^2$ of metal, and the pad I may be round or elongated, as shown in Fig. 1. The back $I^2$ of the pad I is provided with a spherical offset $I^3$ engaged by the correspondingly-shaped head H' of the bolt H, so that the pad I may be turned on the bolt H into any desired angular position, as the said offset $I^3$ and the head H' of the bolt H form a ball and socket joint. The segmental offset $I^3$ is provided with an enlarged central opening $I^4$ for the free passage of the bolt H. The nut $H^2$ of the bolt H screws against one face of the sliding block G, while the offset $I^3$ abuts against the front faces of the arms $F^2$ (see Fig. 4) for securely clamping the pad in place after the latter has been adjusted or moved into the desired angular position, and for clamping the block G in place on the guide arms $F^2$. It will also be noticed that by the arrangement described, the block G, bolt H and pad I may be moved up and down on the members $F^2$ of the spring F, and as the latter moves with the annular arm E, it is evident that the pad I can be readily adjusted for engagement with the afflicted part, and by adjusting the pad on its ball and socket joint connection it is evident that one side of the pad may exert a greater pressure on a portion of the afflicted part than on another portion thereof. The lower end of the spring F is provided with a stud K for the attachment of a strap.

It will be noticed that by the adjustment of the arm E the pad can be moved into the desired position over the afflicted part without adjustment of the belt especially as the pad I can always be moved up or down on the spring F, and an angular position can be given to the pad by the ball and socket joint connection. By having the spring F, the truss is rendered pliable and at the same time an even pressure is maintained on the afflicted part.

The truss can be made double, to cover both sides of the body, and by the adjustments the truss can be readily used for both males and females.

The pad I is preferably provided with a supplementary pad J provided with an arm J' extended between the sponge I' and the back I² and secured to the latter by a bolt K engaging a slot J² formed in the arm J' to permit of adjusting the pad J relative to the pad I. The pad J is arranged in such a manner as to press the wearer's body immediately above the pelvis.

Having thus described my invention, I claim as new and desire to secure by Letters Patent:

1. A truss, comprising a belt, a plate secured to one end of the belt to project therefrom, and longitudinally adjustable thereon, an angular plate to which the other end of the belt is removably attached, means for securing one member of the angular plate to the first plate to swing up and down, a spring secured to the other member of the angular plate, a pad, and means for mounting the pad on the spring, whereby it may be adjusted vertically thereon.

2. A truss comprising a belt, a plate projecting from one end of the belt and having a longitudinal slot in one end and curved slots in its other end, screws passing through the longitudinal slot of the plate into the belt, an angular plate to which the other end of the belt is removably attached, screws passing through the slots of the first plate into one member of the angular plate, a spring secured to the other member of the angular plate and a pad adjustably mounted on the lower end of the spring.

3. In a truss, a belt, a plate adjustably secured to one end of the belt and projecting therefrom, said plate being provided with segmental slots in its projecting end, a second plate provided with means for removably securing the other end of the belt thereto, screws passing through the segmental slots of the first plate into the second plate, a downwardly extending spring secured to the second plate, a pad, and means for mounting the pad on the spring whereby it may be adjusted vertically thereon.

4. In a truss, a plate to which the ends of a belt are attached, a spring having spaced and parallel members secured to the plate and each formed with a laterally projecting coil, a pad, an apertured block fitting and slidable between the members of the spring, a bolt having its head in engagement with the pad and passing through the said block, and a nut on the bolt.

In testimony whereof I have signed my name to this specification in the presence of two subscribing witnesses.

JAMES THOMAS HAILE.

Witnesses:
  JAMES R. ANDERSON,
  WALTER GARNETT.

---

Copies of this patent may be obtained for five cents each, by addressing the "Commissioner of Patents, Washington, D. C."